(12) United States Patent
Funada et al.

(10) Patent No.: US 12,360,530 B2
(45) Date of Patent: Jul. 15, 2025

(54) NOTIFICATION CONTROL APPARATUS, CONTROL METHOD, AND COMPUTER READABLE MEDIUM

(71) Applicant: NEC Corporation, Tokyo (JP)

(72) Inventors: Junichi Funada, Tokyo (JP); Hisashi Mizumoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 281 days.

(21) Appl. No.: 18/014,655

(22) PCT Filed: Jul. 8, 2020

(86) PCT No.: PCT/JP2020/026749
§ 371 (c)(1),
(2) Date: Jan. 5, 2023

(87) PCT Pub. No.: WO2022/009350
PCT Pub. Date: Jan. 13, 2022

(65) Prior Publication Data
US 2023/0229164 A1    Jul. 20, 2023

(51) Int. Cl.
*G08B 23/00* (2006.01)
*G05D 1/00* (2006.01)
(Continued)

(52) U.S. Cl.
CPC ......... *G05D 1/0094* (2013.01); *G06V 20/40* (2022.01); *G06V 20/52* (2022.01); *G06V 40/10* (2022.01);
(Continued)

(58) Field of Classification Search
CPC ...... G05D 1/0094; G06V 20/40; G06V 20/52; G06V 40/10; G06V 40/20; G06V 10/82;
(Continued)

(56) References Cited

U.S. PATENT DOCUMENTS 9,390,611 B1    7/2016  Maruyama et al.
9,923,938 B2 *  3/2018  Bellamy ............. H04L 12/1822
(Continued)

FOREIGN PATENT DOCUMENTS

JP    2017-098958 A    6/2017
JP    2018-097564 A    6/2018
(Continued)

OTHER PUBLICATIONS

JP Office Communication for JP Application No. 2022-534570, mailed on Mar. 19, 2024 with English Translation.
(Continued)

*Primary Examiner* — Anh V La

(57) ABSTRACT

A notification control apparatus (2000) acquires video data or audio data for a plurality of persons (10) (a human group (40)) who have a conversation within a predetermined distance with each other in a surveillance area. The notification control apparatus (2000) determines whether or not the human group (40) is in a state suitable for receiving a notification using the acquired data. When the human group (40) is in the state suitable for receiving the notification, the notification control apparatus (2000) issues a predetermined notification.

10 Claims, 5 Drawing Sheets

(51) Int. Cl.
*G06V 20/40* (2022.01)
*G06V 20/52* (2022.01)
*G06V 40/10* (2022.01)
*G06V 40/20* (2022.01)
*G08B 21/02* (2006.01)
*G10L 15/22* (2006.01)
*G10L 25/57* (2013.01)
*H04R 1/02* (2006.01)
*H04R 1/32* (2006.01)

(52) U.S. Cl.
CPC ............ *G06V 40/20* (2022.01); *G08B 21/02* (2013.01); *G10L 15/22* (2013.01); *G10L 25/57* (2013.01); *H04R 1/028* (2013.01); *H04R 1/323* (2013.01)

(58) Field of Classification Search
CPC ...... G06V 40/174; G08B 21/02; G08B 21/22; G10L 15/22; G10L 25/57; H04R 1/028; H04R 1/323; H04R 27/00; G06Q 10/105; G06Q 50/265; G06Q 50/10
USPC .......... 340/573.1, 573.4, 686.1, 686.6, 691.6
See application file for complete search history.

(56) References Cited

U.S. PATENT DOCUMENTS

| | | |
|---|---|---|
| 10,803,714 B1 * | 10/2020 | Khera .................. F21V 14/006 |
| 11,184,739 B1 * | 11/2021 | Wellig .................. H04W 4/021 |
| 2010/0188188 A1 | 7/2010 | Funada et al. |
| 2019/0356534 A1 | 11/2019 | Narayanaswamy et al. |
| 2020/0394419 A1 | 12/2020 | Takayanagi |
| 2021/0341338 A1 * | 11/2021 | Shtrom .................. A61B 5/746 |
| 2021/0390840 A1 * | 12/2021 | Rejal .................... G08B 21/182 |

FOREIGN PATENT DOCUMENTS

WO 2009/011380 A1 1/2009
WO 2019/239813 A1 12/2019

OTHER PUBLICATIONS

International Search Report for PCT Application No. PCT/JP2020/026749, mailed on Oct. 13, 2020.

* cited by examiner

NOTIFICATION CONTROL APPARATUS, CONTROL METHOD, AND COMPUTER READABLE MEDIUM

This application is a National Stage Entry of PCT/JP2020/026749 filed on Jul. 8, 2020, the contents of all of which are incorporated herein by reference, in their entirety.

TECHNICAL FIELD

The present invention relates to a technique for controlling a notification.

BACKGROUND ART

From the perspective of preventing the spread of infectious diseases or the like, a situation in which a plurality of persons have a conversation within a close distance of each other may not be preferable. In order to solve this problem, systems for detecting this situation and issuing a notification have been developed. For example, Patent Literature 1 discloses a technique for detecting that a resident and a visitor have had a conversation with each other for a predetermined period of time or longer using images obtained from a camera installed in a facility and issuing a notification indicating that the risk of being infected with an infectious disease is high in response to the detection.

CITATION LIST

Patent Literature

[Patent Literature 1] International Patent Publication No. WO 2019/239813

SUMMARY OF INVENTION

Technical Problem

In the apparatus disclosed in Patent Literature 1, a notification is issued immediately after it is determined that the resident and the visitor have had a conversation for the predetermined period of time or longer. Therefore, when the notification is issued, these persons may not be in a state suitable for receiving the notification.

The present invention has been made in view of the aforementioned problem and one of the objects is to provide a technique for issuing a notification to persons to whom this notification is to be sent at an appropriate timing.

Solution to Problem

A notification control apparatus according to the present disclosure includes: a determination unit configured to acquire, for a plurality of persons who have a conversation within a predetermined distance of each other in a surveillance area, video data including the plurality of persons or audio data including voices of the plurality of persons, and analyze the video data or the audio data to determine whether or not the plurality of persons are in a state suitable for receiving a predetermined notification; and a notification unit configured to output the predetermined notification when it is determined that the plurality of persons are in the state suitable for receiving the predetermined notification.

A control method according to the present disclosure is executed by a computer. This control method includes: a determining step of acquiring, for a plurality of persons who have a conversation within a predetermined distance of each other in a surveillance area, video data including the plurality of persons or audio data including voices of the plurality of persons and analyzing the video data or the audio data to determine whether or not the plurality of persons are in a state suitable for receiving a predetermined notification; and a notifying step of outputting the predetermined notification when it is determined that the plurality of persons are in the state suitable for receiving the predetermined notification.

A computer readable medium according to the present disclosure stores a program for causing a computer to execute a control method according to the present disclosure.

Advantageous Effects of Invention

According to the present invention, a technique for issuing a notification to persons to whom this notification is to be sent at an appropriate timing is provided.

EXAMPLE EMBODIMENT

Hereinafter, with reference to the drawings, example embodiments of the present disclosure will be described. Throughout the drawings, the same or corresponding components are denoted by the same reference symbols and overlapping descriptions will be omitted as necessary for the sake of clarification of the description.

First Example Embodiment

Figure 1:
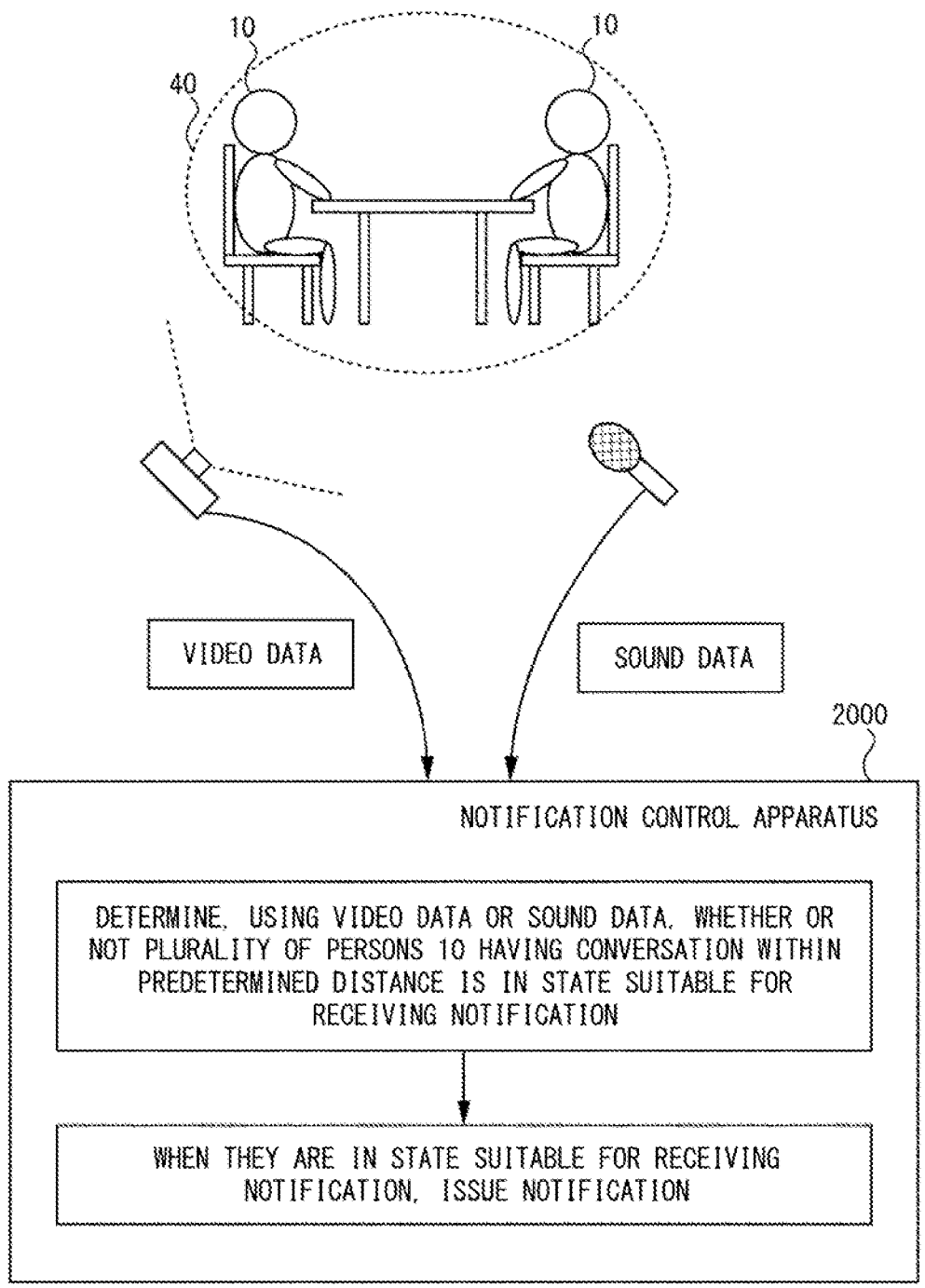
FIG. 1 is a diagram illustrating an overview of a notification control apparatus according to a first example embodiment.

FIG. 1 is a diagram illustrating an overview of a notification control apparatus 2000 according to a first example embodiment. Note that the following description made with reference to FIG. 1 is a diagram for facilitating understanding of the notification control apparatus 2000 according to the first example embodiment, and operations of the notification control apparatus 2000 according to the first example embodiment are not limited to those described below.

The notification control apparatus 2000 acquires sensor data for a plurality of persons 10 (hereinafter a human group 40) detected to have a conversation within a predetermined distance L1 in a surveillance area. The surveillance area may be arbitrary place such as an office. Further, the surveillance area may be outdoors. The sensor data is video data generated by capturing the human group 40 by a camera or audio data generated by recording a conversation held by the human group 40 by a microphone. The human group 40 may be detected by the notification control apparatus 2000 or by an apparatus other than the notification control apparatus 2000.

The notification control apparatus 2000 outputs a predetermined notification to the human group 40. Before outputting the predetermined notification, the notification control apparatus 2000 determines whether or not the human group 40 is in a state suitable for receiving the notification (hereinafter, referred to as a suitable state) using the sensor data. When it is determined that the human group 40 is in the suitable state, the notification control apparatus 2000 outputs the predetermined notification. On the other hand, when the human group 40 is not in the suitable state, the notification control apparatus 2000 does not output the predetermined notification.

Example of Advantageous Effects

From the perspective of preventing the spread of infectious diseases or the like, a situation in which a plurality of persons have a conversation within a predetermined distance L1 may not be preferable. Therefore, if this situation is detected, it is preferable to issue a notification to the plurality of persons to let these persons notice that they are in unpreferable situation.

However, it is not always appropriate to issue such the notification immediately. When, for example, an important conversation is taking place, it is preferable to wait until there is a break in the conversation before issuing the notification to strike a right balance between the effect of preventing the spread of infection and work productivity.

With regard to the above point, with the notification control apparatus 2000, it is determined whether or not the human group 40 is in the suitable state (state suitable for receiving a notification), and the predefined notification is issued when the human group 40 is in the suitable state. Accordingly, compared to a case in which a notification is issued without taking the state of the human group 40 into account, a notification may be sent to the human group 40 at a more appropriate timing.

Hereinafter, the notification control apparatus 2000 according to this example embodiment will be described in further detail.

Example of Functional Configuration

Figure 2:
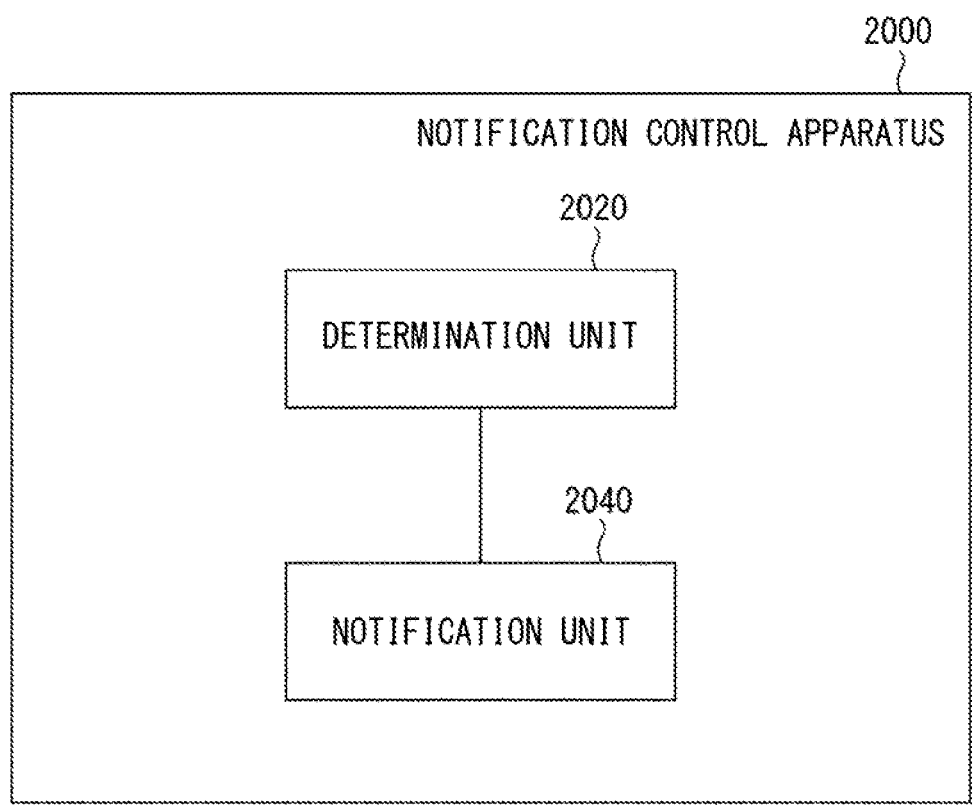
FIG. 2 is a diagram illustrating a functional configuration of the notification control apparatus.

FIG. 2 is a diagram illustrating a functional configuration of the notification control apparatus 2000. The notification control apparatus 2000 includes a determination unit 2020 and a notification unit 2040. The determination unit 2020 acquires the sensor data for the human group 40, analyzes this sensor data, and determines whether or not the human group 40 is in the suitable state. The notification unit 2040 issues the predetermined notification when the human group 40 is in the suitable state. Note that the human group 40 is a plurality of persons 10 detected to have a conversation within the predetermined distance L1.

Example of Hardware Configuration

Each functional configuration unit of the notification control apparatus 2000 may be implemented with hardware (e.g., a hardwired electronic circuit) that implements each functional configuration unit or by a combination of hardware with software (e.g., a combination of an electronic circuit with a program that controls the electronic circuit). Hereinafter, a case in which each functional configuration unit of the notification control apparatus 2000 is implemented with a combination of hardware with software will be further described.

Figure 3:
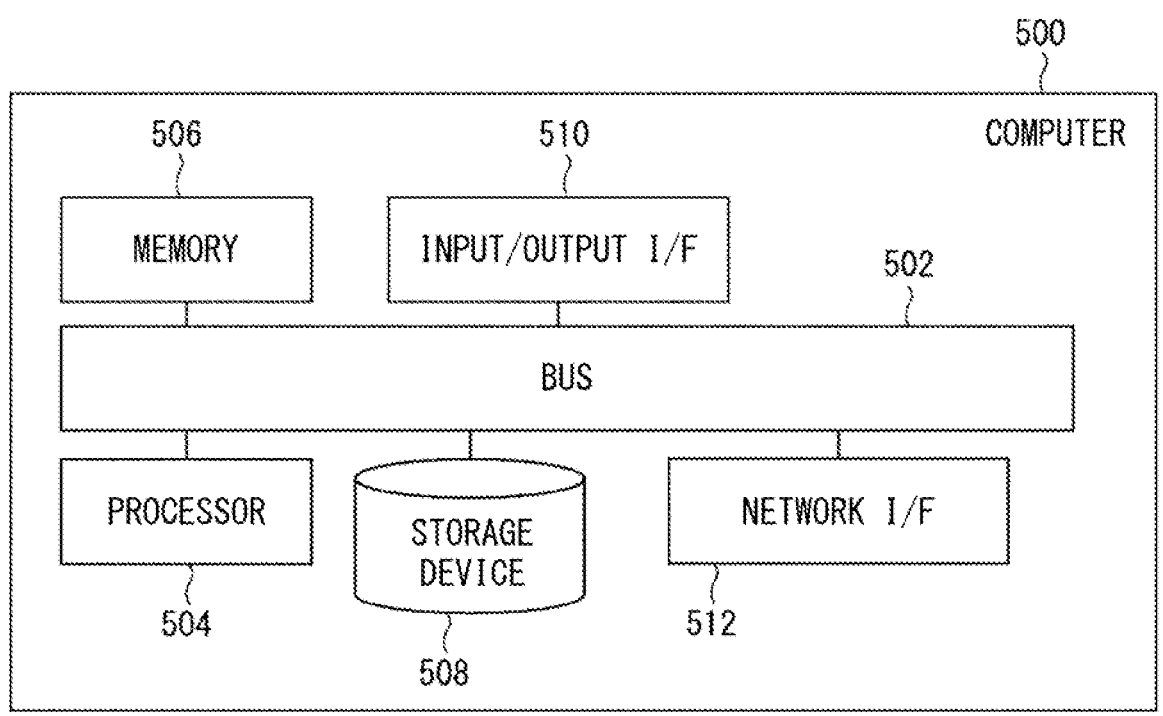
FIG. 3 is a block diagram illustrating a hardware configuration of a computer that implements the notification control apparatus.

FIG. 3 is a block diagram illustrating a hardware configuration of a computer 500 that implements the notification control apparatus 2000. The computer 500 may be any type of computer. The computer 500 is, for example, a stationary computer such as a Personal Computer (PC) or a server machine. The computer 500 may instead be a portable computer such as a smartphone or a tablet terminal. In another example, the computer 500 may be a controller embedded in the mobile robot that will be described later (a controller 600 that will be described later). In this case, the notification control apparatus 2000 is implemented as a mobile robot (i.e., the mobile robot has a function as the notification control apparatus 2000 as well). The computer 500 may be a special-purpose computer that is designed to implement the notification control apparatus 2000 or may be a general-purpose computer.

For example, by installing a specific application in the computer 500, each function of the notification control apparatus 2000 is implemented in the computer 500. The above application is formed of a program for implementing a functional configuration unit of the notification control apparatus 2000.

The computer 500 includes a bus 502, a processor 504, a memory 506, a storage device 508, an input/output interface 510, and a network interface 512. The bus 502 is a data transmission path for enabling the processor 504, the memory 506, the storage device 508, the input/output interface 510, and the network interface 512 to transmit and receive data among them. However, the method for connecting the processor 504 and the like to one another is not limited to the bus connection.

The processor 504 may be any type of processor such as a Central Processing Unit (CPU), a Graphics Processing Unit (GPU), or a Field-Programmable Gate Array (FPGA). The memory 506 is a main memory unit that is implemented using a Random Access Memory (RAM) or the like. The storage device 508 is an auxiliary storage device that is implemented with a hard disk, a Solid State Drive (SSD), a memory card, or a Read Only Memory (ROM).

The input/output interface 510 is an interface for connecting the computer 500 with an input/output device. An input device such as a keyboard and an output device such as a display device are connected, for example, to the input/output interface 510.

The network interface 512 is an interface for connecting the computer 500 to a wireless network. This network may be a Local Area Network (LAN) or a Wide Area Network (WAN). For example, the computer 500 is connected to a mobile robot via the network interface 512 and the wireless network in such a way that the computer 500 is able to communicate with the mobile robot.

The storage device 508 stores a program for implementing each functional configuration unit of the notification control apparatus 2000 (a program for implementing the above-mentioned application). The processor 504 loads this program into the memory 506 to execute the loaded program, thereby implementing each functional configuration unit of the notification control apparatus 2000.

Further, the storage device 508 may store the conversation information 60. In this case, the storage device 50 is implemented with the storage device 508. The storage device 50 may instead be implemented with a storage device other than the storage device 508 (e.g., a storage device provided outside the computer 500).

The notification control apparatus 2000 may be implemented with one computer 500 or may be implemented with a plurality of computers 500. In the latter case, the configurations of the computers 500 are not required to be the same as each other, and may be different from each other.

Further, a plurality of conversation surveillance apparatuses 2000 may be provided for one surveillance area. For example, a plurality of mobile robots are introduced in one surveillance area and each of these mobile robots operates as the notification control apparatus 2000.

Example of Hardware Configuration of Mobile Robot

Figure 4:
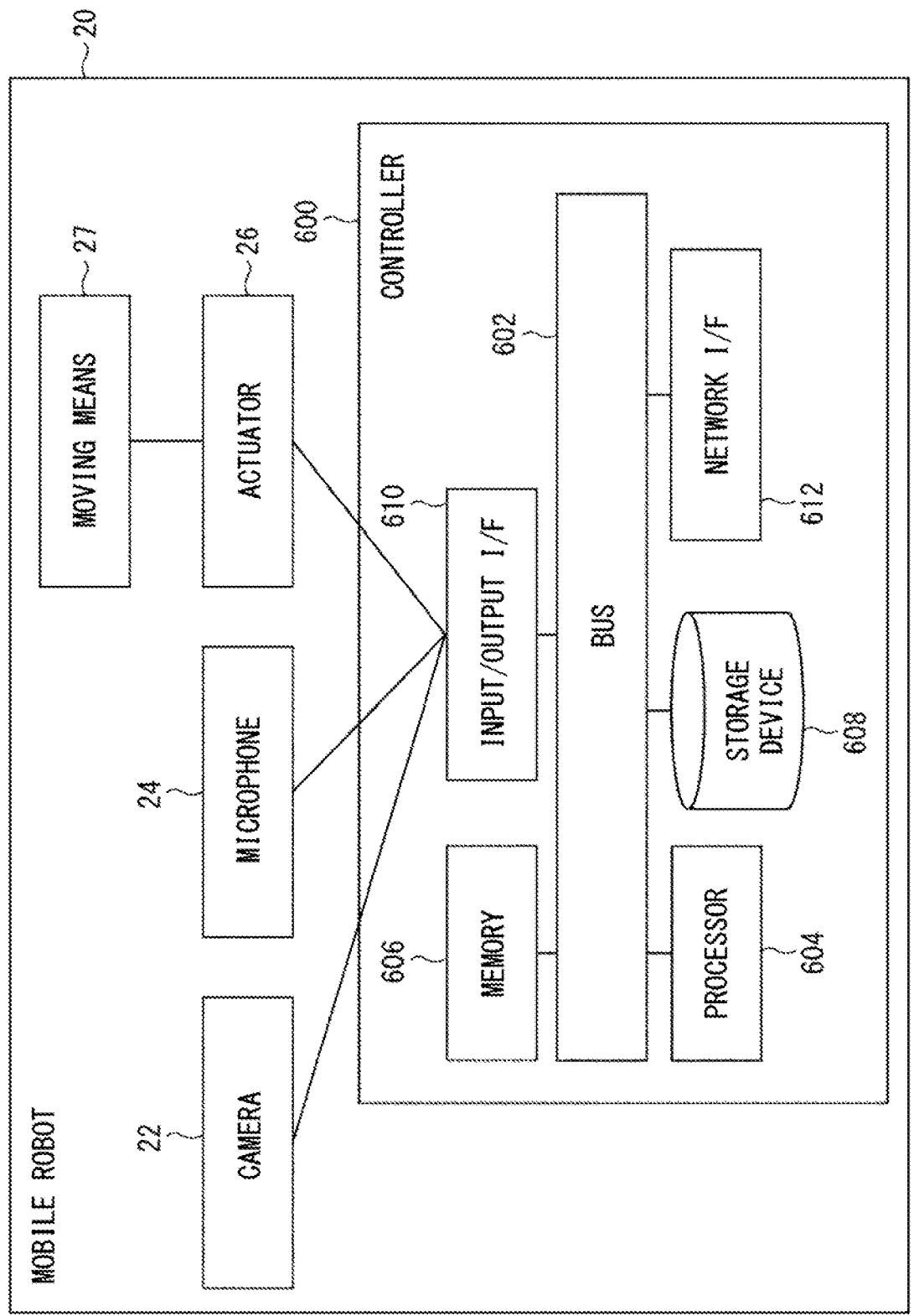
FIG. 4 is a block diagram illustrating a hardware configuration of a mobile robot.

FIG. 4 is a block diagram illustrating a hardware configuration of the mobile robot. The mobile robot 20 includes a camera 22, a microphone 24, an actuator 26, a moving means 27, and a controller 600. The mobile robot 20 moves by the moving means 27 operating in response to output of the actuator 26. The moving means 27 is, for example, means such as wheels for achieving running. In this case, the mobile robot 20 runs to travel in the surveillance area. In another example, the moving means 27 may be means such as a propeller for achieving flying. In this case, the mobile robot 20 flies within the surveillance area. The output of the actuator 26 is controlled by the controller 600. The output of the actuator 26 is controlled by the controller 600.

The controller 600 is any type of computer and is implemented, for example, by an integrated circuit such as a System on a Chip (SoC) or a System in a Package (SiP). In another example, the controller 600 may be implemented with a mobile terminal such as a smartphone. The controller 600 includes a bus 602, a processor 604, a memory 606, a storage device 608, an input/output interface 610, and a network interface 612. The bus 602, the processor 604, the memory 606, the storage device 608, the input/output interface 610, and the network interface 612 include functions similar to those of the bus 502, the processor 504, the memory 506, the storage device 508, the input/output interface 510, and the network interface 512, respectively.

Flow of Process

Figure 5:
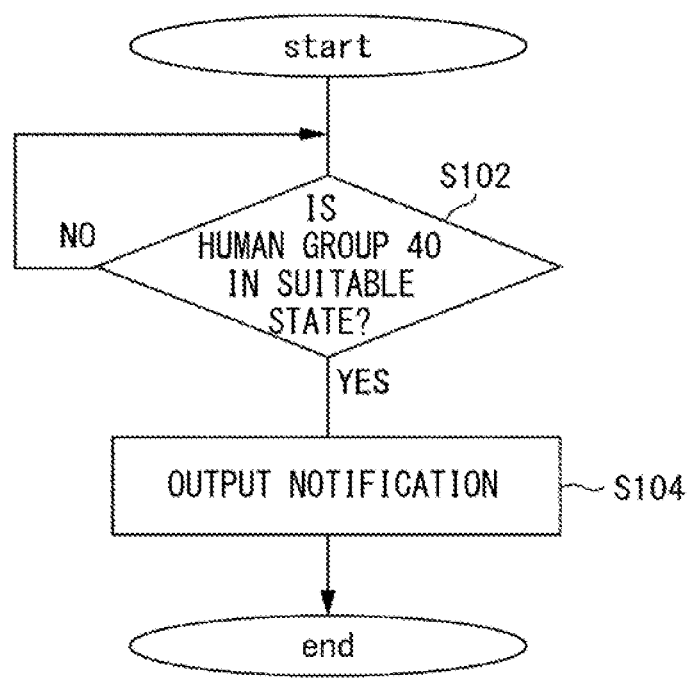
FIG. 5 is a flowchart illustrating a flow of process executed by the notification control apparatus according to the first example embodiment.

FIG. 5 is a flowchart illustrating a flow of process executed by the notification control apparatus 2000 according to the first example embodiment. The determination unit 2020 acquires sensor data (S102). The determination unit 2020 determines whether or not the human group 40 is in the suitable state using the acquired sensor data (S104). When the human group 40 is not in the suitable state (S104: NO), the determination unit 2020 executes S102 and S104 again. That is, the determination unit 2020 acquires new sensor data and again determines whether or not the human group 40 is in the suitable state using the sensor data.

When it is determined that the human group 40 is in the suitable state (S102: YES), the notification unit 2040 outputs a predetermined notification (S104).

Note that in a case where the mobile robot 20 is used to output the notification, the notification control apparatus 2000 may move the mobile robot 20 to approach the human group 40 when it is determined that the human group 40 is not in the suitable state (S102: NO). Accordingly, it is possible to output a notification immediately after the human group 40 is in the suitable state.

Further, in FIG. 5, S102 is repeatedly executed until the human group 40 is in the suitable state. However, a termination condition may be provided for this repetition, and the process of FIG. 5 may be terminated when this termination condition is satisfied. For example, the termination condition may be a condition that "in the human group 40, respective distances between the persons 10 are larger than a predetermined distance L1" or a condition that "a predetermined period of time has passed after S102 was first executed".

Detection of Human Group 40

As a premise for determining whether or not a human group 40 is in the suitable state, a human group 40 (that is, a plurality of persons 10 who are having a conversation within the predetermined distance L1) is detected. Hereinafter, an apparatus that detects the human group 40 will be referred to as a conversation surveillance apparatus. Note that the conversation surveillance apparatus may be the notification control apparatus 2000 or may be an apparatus other than the notification control apparatus 2000. The former case means that the notification control apparatus 2000 also serves as a conversation surveillance apparatus.

First, the conversation surveillance apparatus detects a plurality of persons 10 who are located within the predetermined distance L1. This detection is performed using video data including these persons 10. This video data is generated by a camera provided to capture the surveillance area. This camera may be a camera fixed in a specific position (e.g., a surveillance camera that is installed on the ceiling or the wall) or may be a camera provided in the mobile robot.

The conversation surveillance apparatus detects the plurality of persons 10 from the video data and determines that the distance between these persons 10 are equal to or smaller than the predetermined distance L1, thereby detecting the plurality of persons 10 who are located within the predetermined distance L1. Here, there are various methods for determining that the distances between the persons 10 are equal to or smaller than the predetermined distance L1. For example, the conversation surveillance apparatus analyzes the video data and detects a plurality of persons 10 from the video data. After the plurality of persons 10 are detected, the conversation surveillance apparatus controls a projector to project an image indicating a specific distance (hereinafter, referred to as a distance image) onto the ground. Here, the distance image is projected onto a position so that both the plurality of persons 10 that have been detected and the distance image can be included in a capturing range of the camera. The distance indicated by the distance image is, for example, the above-mentioned predetermined distance L1. The projector may be mounted on the mobile robot or may be installed in another place (e.g., the ceiling).

The conversation surveillance apparatus detects the plurality of persons 10 and the distance image from the video data, and compares the distance between the persons 10 with the size of the distance image (i.e., the predetermined distance L1 on the image). When the distances between the persons 10 are smaller than the size of the distance image, the conversation surveillance apparatus detects these persons 10 as the plurality of persons 10 located within the predetermined distance L1.

The method for determining that the distance between the persons 10 is equal to or smaller than the predetermined distance L1 is not limited to the above-mentioned method and other existing techniques may instead be used.

The conversation surveillance apparatus makes a determination (hereinafter, referred to as a conversation determination) regarding whether or not the plurality of persons 10 located within the predetermined distance L1 and thus detected having a conversation. Hereinafter, the plurality of persons 10 regarding whom the conversation determination is to be made will be referred to as a candidate group. For example, the conversation surveillance apparatus performs a conversation determination using video data from which the candidate group has been detected. Then, the candidate group that is determined to be having a conversation is detected as the human group 40. Hereinafter, a method of the conversation determination will be illustrated in detail.

Determination Based on Mouth Movement

For example, the conversation surveillance apparatus determines the presence of a conversation by determining whether or not each of the persons 10 included in the candidate group is moving his/her mouth using video data. For example, if any one of the persons included in the candidate group is moving his/her mouth, the conversation surveillance apparatus determines that all the persons 10 included in the candidate group are having a conversation (that is, detects the candidate group as the human group 40). Further, when none of the respective persons 10 included in the candidate group is moving his/her mouth, the conversation surveillance apparatus determines that the candidate group is not having a conversation (that is, the candidate group is not detected as the human group 40).

The conversation surveillance apparatus may determine that a conversation is taking place by only persons 10 who are moving their mouths among the persons 10 included in the candidate group. In this case, the conversation surveillance apparatus detects a candidate group from which persons 10 who are not determined to be moving his/her mouth are excluded, as a human group 40. That is, when two or more persons 10 who are moving their mouths have been detected from the video data, the conversation surveillance apparatus detects these plurality of persons 10 who are moving their mouths as the human group 40. On the other hand, when no person 10 who is moving his/her mouth has been detected or only one person 10 who is moving his/her mouth has been detected from the video data, the conversation surveillance apparatus does not detect the candidate group as the human group 40.

For example, the conversation surveillance apparatus is configured to compute, from time-series data of an image region representing the mouth of a person and its surroundings, the probability that this person is moving his/her mouth. Then, the conversation surveillance apparatus handles a person 10 whose probability of moving his/her mouth is equal to or larger than a threshold as a person 10 who is moving his/her mouth. On the other hand, the conversation surveillance apparatus handles a person 10 whose probability of moving his/her mouth is smaller than the threshold as a person 10 who is not moving his/her mouth.

Determination Based on Direction of Face or Line-of-sight

For example, the conversation surveillance apparatus determines the direction of the face or the line-of-sight of each of the persons 10 included in the candidate group using the video data, and determines the presence of a conversation based on these information items. Hereinafter, a case in which the face direction is used will be described in further detail. Unless otherwise stated, "face" is replaced by "line-of-sight" in the following explanation for a case in which the direction of the line-of-sight is used.

For example, when each of the persons 10 is facing one of the other persons 10, the conversation surveillance apparatus determines that all the persons 10 included in the candidate group are having a conversation (that is, detects the candidate group as the human group 40). Further, when none of the respective persons 10 included in the candidate group is facing any persons 10, the conversation surveillance apparatus determines that the candidate group is not having a conversation (that is, the candidate group is not detected as the human group 40).

The conversation surveillance apparatus may determine that a conversation is taking place by only persons 10 who are facing other persons 10. In this case, the conversation surveillance apparatus excludes persons 10 who are not determined to be facing other persons 10 from the candidate group. That is, when two or more persons who are facing other persons 10 are detected from the video data, the conversation surveillance apparatus detects these plurality of persons 10 as the human group 40. On the other hand, when none of the persons who is facing another person 10 is detected from the video data or only one of the persons 10 who is facing another person 10 is detected, the conversation surveillance apparatus does not detect the candidate group as the human group 40.

For example, the conversation surveillance apparatus is configured to compute, from time-series data of an image region indicating the face of a person, the probability that this person is facing each of a plurality of directions (e.g., predetermined four directions or predetermined eight directions). The conversation surveillance apparatus determines the direction with the highest computed probability as the direction of the face of the person.

Method for Using Trained Model

The conversation surveillance apparatus may include a trained model that identifies whether or not the candidate group is having a conversation in response to input of video data including faces of the respective persons 10 included in the candidate group. For example, in response to the input of the video data including the faces of the respective persons included in the candidate group, this model outputs the probability that the candidate group is having a conversation. This model may be implemented with, for example, a recurrent neural network (RNN). When the probability output from the model is equal to or larger than a threshold, the conversation surveillance apparatus detects the candidate group as the human group 40. On the other hand, when the probability output from the model is smaller than the threshold, the conversation surveillance apparatus does not detect the candidate group as the human group 40.

The aforementioned model is trained in advance using training data formed of a combination of "video data and the probability of ground truth (being 1 when a conversation is taking place, and being 0 when a conversation is not taking place)". Existing techniques may be used as a technique for training the model using training data formed of a combination of input data and a ground-truth label.

Conversation Determination Using Mobile Robot 20

Suppose that a candidate group has been detected from video data generated by a fixed camera. In this case, the conversation determination regarding the candidate group may be performed, not using this video data, but using video data generated by a camera provided in the mobile robot 20 or audio data generated by a microphone provided in the mobile robot 20.

For example, the conversation surveillance apparatus first determines, using video data obtained from the fixed camera, which one of the three situations the candidate group is in: 1) a conversation is taking place; 2) a conversation is not taking place; and 3) the presence of a conversation cannot be determined. For example, the conversation determination apparatus analyzes the aforementioned video data, thereby computing both the probability that a conversation is taking place and the probability that a conversation is not taking place. Then, the conversation surveillance apparatus determines that: 1) a conversation is taking place when the probability that a conversation is taking place is equal to or larger than the threshold; 2) a conversation is not taking place when the probability that a conversation is not taking place is equal to or larger than the threshold; or 3) the presence or the absence of the conversation cannot be determined when both the probability that a conversation is taking place and the probability that a conversation is not taking place are smaller than the thresholds. A specific situation in which the presence of the conversation cannot be determined may include a situation in which the movement or the direction of the face of the person 10 cannot be determined since the face of the person 10 is not included in the video data obtained from the fixed camera (e.g., the person 10 shows his/her back to the fixed camera).

When the presence of the conversation cannot be determined even when the video data from which the candidate group has been detected is used, for example, the conversation surveillance apparatus controls the movement of the mobile robot 20 so that the conversation surveillance apparatus can obtain data from which it can be determined whether or not the plurality of persons 10 are having a conversation from the camera 22 or the microphone 24 provided in the mobile robot 20. When video data is used, the conversation surveillance apparatus moves, for example, the mobile robot 20 to a position where the mobile robot 20 can capture the faces of the respective persons 10 included in the candidate group. Further, when audio data is used, the conversation surveillance apparatus moves, for example, the mobile robot 20 to a position whose distance from the candidate group is equal to or smaller than a predetermined distance L2. This is because, in a place located away from the person 10, even when a conversation is taking place, it is possible that the sounds of the conversation may not be included in the audio data.

The method for determining the presence of the conversation using the video data has already been described above. Hereinafter, a method for determining the presence of the conversation using audio data will be described.

When audio data is used, the conversation surveillance apparatus makes a conversation determination for the candidate group based on a relation between the volume of a sound included in the audio data and the distance to the candidate group. Even when the candidate group is having a conversation, if the mobile robot 20 is located away from the candidate group, it is difficult to detect the sound of the conversation by the microphone 24. In order to solve this problem, the conversation surveillance apparatus moves the mobile robot 20 to a position whose distance from the candidate group is equal to or smaller than the predetermined distance L2. This predetermined distance L2 is set in advance as a distance where the sound of a conversation held by a candidate group can be detected by the microphone 24 when the candidate group is having a conversation.

The conversation surveillance apparatus acquires audio data from the microphone 24 of the mobile robot 20 that has moved to a position whose distance from the candidate group is equal to or smaller than the predetermined distance L2, and determines whether or not the volume of the sound represented by the audio data is equal to or larger than a threshold. When the volume of the sound represented by the audio data is equal to or larger than the threshold, the conversation surveillance apparatus determines that the candidate group is having a conversation (that is, the conversation surveillance apparatus detects the candidate group as the human group 40). On the other hand, when the volume of the sound represented by the audio data is smaller than the threshold, the conversation surveillance apparatus determines that the candidate group is not having a conversation (that is, the conversation surveillance apparatus does not detect the candidate group as the human group 40).

Note that the above threshold may be a fixed value or may be dynamically set in accordance with the distance from the mobile robot 20 to the candidate group. In the latter case, for example, a function that defines the relation between the distance and the threshold is defined in advance. For the time at which the audio data is obtained from the microphone 24, the conversation surveillance apparatus determines the distance from the mobile robot 20 to the candidate group, determines the threshold by inputting the distance into the above function, and compares the volume of the sound represented by the audio data with the determined threshold.

Further, the conversation surveillance apparatus may analyze the audio data, and determine whether or not the sound includes human voices. In this case, the conversation surveillance apparatus determines that the candidate group is having a conversation when the volume of the sound represented by the audio data is equal to or larger than a threshold and this sound includes human voices. On the other hand, when the volume of this sound is smaller than the threshold or when this sound does not include human voices, the conversation surveillance apparatus determines that the candidate group is not having a conversation. Accordingly, for example, it is possible to avoid falsely detecting a situation in which sounds other than human voices are provided as the situation in which the candidate group is having a conversation.

Note that the conversation surveillance apparatus may take into account the number of persons whose voices are included in the audio data. For example, when the volume of the sound represented by the audio data is equal to or larger than the threshold and this sound includes voices of a plurality of persons, the conversation surveillance apparatus determines that the candidate group is having a conversation. On the other hand, when the volume of the sound is smaller than a threshold or the number of persons whose voices are included in the sound is one or none, the conversation surveillance apparatus determines that the candidate group is not having a conversation. Accordingly, for example, it is possible to avoid falsely detecting a situation where one person is talking to himself/herself a situation in which the candidate group is having a conversation.

Further, when the degree of accuracy of the result of the determination regarding whether or not the audio data includes human voices or the degree of accuracy of the result of the computation regarding the number of people whose voices are included in the audio data are low, the conversation surveillance apparatus may determine that the presence of the conversation cannot be determined. For example, when both the probability that the audio data includes human voices and the probability that the audio data does not include human voices are smaller than predetermined thresholds, the conversation surveillance apparatus determines that the presence of the conversation cannot be determined.

Further, the conversation surveillance apparatus may include a trained model that identifies whether or not the audio data includes sounds of a plurality of persons 10 who are having a conversation in response to an input of this audio data. This model outputs, for example, the probability that a conversation is taking place in response to the input of the audio data. This model may be implemented with, for example, a recurrent neural network (RNN).

For example, when the probability output from the model is equal to or larger than the threshold, the conversation surveillance apparatus determines that the candidate group is having a conversation. On the other hand, when the probability output from the model is smaller than the threshold, the conversation surveillance apparatus determines that the candidate group is not having a conversation.

Note that the above-mentioned model is trained in advance using training data formed of a combination of "audio data and the probability of ground truth (being 1 when a conversation is taking place and being 0 when a conversation is not taking place)".

Consideration of Conversation Duration

The conversation surveillance apparatus may detect a candidate group as the human group 40 only when the conversation duration in the candidate group is equal to or larger than a threshold. That is, in this case, "a plurality of persons 10 who are located within the predetermined distance L1 and are having a conversation for a predetermined period of time or longer" are detected as the human group 40.

For example, the conversation surveillance apparatus repeatedly determines whether the candidate group is having a conversation using video data or audio data. When the video data is used, for example, the conversation surveillance apparatus divides the video data into video frame sequences and determines, for each of the video frame sequences, whether or not the candidate group is having a conversation. Likewise, when the audio data is used, for example, the conversation surveillance apparatus divides this audio data into sound frame sequences and determines, for each of the sound frame sequences, whether or not the candidate group is having a conversation. Then, the conversation surveillance apparatus computes a duration of the time during which the state in which the candidate group is having a conversation is continuing (a duration of the time during which video frame sequences or sound frame sequences determined that the candidate group is having a conversation continue) as the duration of the conversation. Then, when the conversation duration is equal to or larger than a threshold, the conversation surveillance apparatus detects the candidate group as the human group 40. Alternatively, the conversation surveillance apparatus may regard that the conversation is continuing even when the conversation is interrupted for a short time.

Determination Regarding Whether State is Suitable State: S102

The determination unit 2020 determines whether or not the human group 40 is in the suitable state. Hereinafter, specific examples of the suitable state and a specific method for making the determination regarding the suitable state will be described.

First Example of Suitable State: Interruption of Conversation

When a plurality of persons are having a conversation, the conversation may be temporarily interrupted. When a notification is provided to these persons, it would be preferable to issue a notification while the conversation is interrupted rather than issuing a notification in the midst of the conversation.

The determination unit 2020 determines whether or not the conversation held by the human group 40 is interrupted using sensor data. For example, when a state in which the human group 40 has not had a conversation continues for a predetermined period of time or longer, the determination unit 2020 determines that the conversation held by the human group 40 is interrupted. In this case, the determination unit 2020 preferably acquires sensor data indicating the result of the detection regarding the latest predetermined time of the sensor data generated by a camera or a microphone.

For example, the determination unit 2020 divides the acquired video data into a plurality of video frame sequences, and makes, for each of the video frame sequences, a determination regarding whether the video frame sequence represents a human group 40 who are having a conversation (the aforementioned conversation determination). For example, when all the plurality of video frame sequences regarding the latest predetermined time represents a human group 40 who are not having a conversation, the determination unit 2020 determines that the conversation held by the human group 40 is interrupted for the latest predetermined time (that is, it is determined that the human group 40 is in the suitable state). On the other hand, when a video frame sequence representing the human group 40 who are having a conversation is present among a plurality of video frame sequences regarding the latest predetermined time, the determination unit 2020 determines that the conversation held by the human group 40 is not interrupted (that is, it is determined that the human group 40 is not in the suitable state).

Further, the determination unit 2020 may determine that a conversation held by a human group 40 is interrupted when the human group 40 who are not having a conversation is represented by each of video frame sequences equal to or larger than a predefined proportion of the video frame sequences obtained from the video data. On the other hand, when the proportion of the video frame sequences representing the human group 40 who are not having a conversation is smaller than the predefined proportion, the determination unit 2020 determines that the conversation held by the human group 40 is not interrupted.

The case in which the audio data is used is similar to the case in which the video data is used. That is, the determination unit 2020 divides the acquired audio data into sound frame sequences, and determines, for each of the sound frames, whether or not it represents a human group 40 who are having a conversation. For example, when all of the plurality of sound frame sequences regarding the latest predetermined time represent a human group 40 who are not having a conversation, the determination unit 2020 determines that the conversation held by the human group 40 is interrupted. On the other hand, when a sound frame sequence representing the human group 40 who are having a conversation is present among the plurality of sound frame sequences regarding the latest predetermined time, the determination unit 2020 determines that the conversation held by the human group 40 is not interrupted.

Further, the determination unit 2020 may determine that the conversation held by the human group 40 is interrupted when a human group 40 who are not having a conversation is represented by each of sound frame sequences equal to or larger than a predefined proportion of the sound frame sequences obtained from the audio data. On the other hand, when the proportion of the sound frame sequences representing the human group 40 who are not having a conversation is smaller than the predefined proportion, the determination unit 2020 determines that the conversation held by the human group 40 is not interrupted.

Whether or not a conversation is interrupted may be determined using a trained model. When video data is used, a model that outputs the probability that the conversation is interrupted in response to an input of the video data is prepared in advance. The determination unit 2020 inputs the acquired video data into the model, thereby obtaining the probability that the conversation is interrupted from this model. Then, when the probability that the conversation is interrupted is equal to or larger than a threshold, the determination unit 2020 determines that the conversation is interrupted. On the other hand, when the probability is smaller than the threshold, the determination unit 2020 determines that the conversation is not interrupted.

The aforementioned model can be trained using training data formed of a pair of "video data and the probability of ground truth (being 1 when the conversation is interrupted and being 0 when the conversation is not interrupted)".

The same is applicable to a model that uses audio data. That is, this model is configured to output the probability that the conversation is interrupted in response to an input of the audio data. The training of the model may be implemented using training data formed of a pair of "audio data and the probability of ground truth (being 1 when a conversation is interrupted and being 0 when a conversation is not interrupted)".

Second Example of Suitable State: Importance of Conversation

While some conversations are important, other conversations are not important. For the human group 40, it would be preferable that a notification be issued while they are having an unimportant conversation rather than the notification being issued while they are having an important conversation.

Thus, the determination unit 2020 determines whether or not a conversation held by the human group 40 is important using sensor data. When the conversation is not important, the determination unit 2020 determines that the human group 40 is in the suitable state. On the other hand, when the conversation is important, the determination unit 2020 determines that the human group 40 is not in the suitable state.

Various methods may be used as a method for determining whether or not a conversation is important using audio data including this conversation. For example, a set of important expressions (hereinafter, important expression information), which are words or phrases that appear in important conversations may be defined in advance and stored in advance in a storage device that can be accessed from the determination unit 2020. The determination unit 2020 detects an important expression from the conversation represented by the audio data using the audio data and the important expression information.

For example, the important expression is detected by converting the audio data into a string data (sentence) and detecting string data that represents an important expression from the string data. In this case, in the important expression information, important expressions are represented by the string data. In another example, the important expression may be detected by detecting the audio features that correspond to the important expression from the audio data. In this case, in the important expression information, the important expressions can be represented by the sound features.

For example, the determination unit 2020 determines that the conversation is important when the important expression is included in the conversation (that is, it is determined that the human group 40 is not in the suitable state). On the other hand, when the important expression is not included in the conversation, the determination unit 2020 determines that the conversation is not important (that is, it is determined that the human group 40 is in the suitable state).

The importance of the conversation may be represented by a degree of importance, not by binary values indicating whether or not a conversation is important. In this case, the determination unit 2020 determines the degree of importance of the conversation by analyzing the audio data. Then, the determination unit 2020 determines that the conversation is important when the degree of importance of the conversation is equal to or larger than a threshold while determining that the conversation is not important when the degree of importance of the conversation is smaller than the threshold.

The degree of importance of the conversation can be represented, for example, by a degree to which the conversation includes important expressions. Specifically, the determination unit 2020 computes the proportion of the number of important expressions included in this conversation to the total number of words included in the conversation represented by the audio data, and uses this proportion as the degree of importance of the conversation. Existing techniques may be used as a technique for counting the number of words included in the conversation expressed by the audio data.

Further, in the important expression information, a weight may be applied to each of the important expressions, and the degree of importance of the conversation may be computed in view of this weight. In this case, a default weight smaller than those of the important expressions is defined for the expressions other than the important expressions. For example, weights of the respective important expressions are set to be values larger than 1 while the weight of the expressions other than the important expressions is set to be 1. The determination unit 2020 computes the proportion of the total weight of the important expressions included in a conversation to the total weight of the words included in the conversation as the degree of importance of the conversation.

Whether or not a conversation is important may be determined using a trained model. This model is configured to output the degree of importance of the conversation represented by audio data in response to an input of the audio data. The determination unit 2020 inputs the acquired audio data into the model, thereby obtaining the degree of importance of the conversation represented by the audio data from this model. Then, the determination unit 2020 determines that the conversation is important when the degree of importance of the conversation is equal to or larger than a threshold, and determines that the conversation is not important when the degree of importance is smaller than the threshold.

The aforementioned model can be trained using training data formed of a pair of "audio data and the degree of importance of ground truth". For example, the degree of importance can be represented by 10 levels, where the minimum value is 1 and the maximum value is 10.

Whether or not a conversation is important can be determined using video data. For example, whether or not a conversation is important can be determined based on facial expression of each of the persons 10 included in the human group 40. When the human group 40 is having an important conversation, the probability that each person 10 has a serious facial expression would be high. On the other hand, when the human group 40 is having an unimportant conversation, the probability that each person 10 does not have a serious facial expression (e.g., all the people are having a conversation with laughing) would be high.

In view of the above, for example, features of serious faces on an image and features of non-serious faces (e.g., smiles) on the image are defined in advance. The determination unit 2020 analyzes the video data using these features, thereby computing an index value indicating the degree of seriousness of facial expression for each of the persons 10 included in the human group 40. Then, the determination unit 2020 determines that the conversation is important (that is, the human group 40 is not in the suitable state) when the computed index value is equal to or larger than a threshold while determining that the conversation is not important (that is, the human group 40 is in the suitable state) when the computed index value is smaller than the threshold.

Further, a trained model that outputs the degree of importance of the conversation held by the plurality of persons included in the video data may be used in response to an input of the video data. In this case, the determination unit 2020 inputs the video data into this model, thereby acquiring the degree of importance of the conversation from this model. The training of this model may be implemented by using training data formed of a pair of "video data and the degree of importance of ground truth".

Execution of Notification: S104

When the human group 40 is in the suitable state (S102: YES), the notification unit 2040 executes a predetermined notification (S104). Various things may be employed as the predetermined notification.

The predetermined notification is, for example, a notification indicating a warning to the human group 40 (hereinafter, referred to as a warning notification). For example, the warning notification is issued using the mobile robot 20. Specifically, the warning notification is a warning screen displayed on a display device provided in the mobile robot 20 or a warning image projected from a projector provided in the mobile robot 20. In another example, the warning notification may be a sound output from a speaker provided in the mobile robot 20. When it is desired to output the notification to only the human group 40, it is preferable that a directional speaker be provided in the mobile robot 20, the output direction of the directional speaker be directed to the human group 40, and the notification be output.

Any kind of information may be included in the warning notification such as the warning screen. The warning notification includes, for example, a message for encouraging people to stop a conversation. In another example, the warning notification includes information by which it is possible to grasp the distances between people (a so-called social distance or physical distance) that should be kept for preventing infectious diseases. It is assumed, for example, that a warning image is projected onto the ground from a projector, as described above. In this case, the warning image is made to include an image indicating the recommended distance between people (e.g., an image of a circle whose diameter is the same value as this distance). In particular, by projecting this warning image near the feet of the human group 40, each of the persons 10 included in the human group 40 is able to visually and easily know how far apart they should at least be away from each other.

Here, the mobile robot 20 may issue a predetermined warning after approaching somewhat close to the human group 40. For example, the notification control apparatus 2000 may move the mobile robot 20 to a position whose distance from the human group 40 is equal to or smaller than a predetermined threshold, and then the predetermined warning may be output from the mobile robot 20. Various existing techniques may be used as the technique for moving the mobile robot 20 to a desired position.

In another example, the notification unit 2040 may transmit a warning notification to each of the persons 10 included in the human group 40. In this case, information that associates identification information of each person 10 who may stay in the surveillance area (e.g., features of each employee on an image or audio features of the voice) with the destination (e.g., an e-mail address) of the notification to be sent to this person 10 is stored in advance in a storage device that can be accessed from the notification unit 2040. The notification unit 2040 determines the identification information of each of the persons 10 included in the human group 40 to which a warning is to be issued, and transmits the above-mentioned notification to the destination that corresponds to this identification information.

Further, the notification unit 2040 may output warning notifications in multiple stages in accordance with the state of the human group 40. In this case, information that associates warning notifications different from each other with a plurality of respective warning levels is stored in advance in a storage device that can be accessed from the notification unit 2040. For example, more prominent (having larger effects of warning) warning notifications are associated with higher warning levels.

For example, the warning level is determined in accordance with the length of the time during which the human group 40 is having a conversation (hereinafter, referred to as a conversation duration) or the degree of importance of the conversation held by the human group 40. For example, the longer the conversation time is, the higher the warning level is. Further, the higher the degree of importance of the conversation held by the human group 40 is, the lower the warning level is.

When the amount of the conversation duration is used, the conversation surveillance apparatus continues to repeatedly determine whether or not the human group 40 is having a conversation even after it is determined that the human group 40 is in the suitable state, thereby measuring the duration of the conversation held by the human group 40. The notification unit 2040 issues warning notifications in multiple stages in accordance with an increase in the amount of the conversation duration.

Suppose that three thresholds of the conversation duration, namely, P1, P2, and P3 ($P1<P2<P3$) are provided. The notification unit 2040 performs a first-level warning process of "moving to a position within a predetermined distance from the human group 40" when the conversation duration becomes equal to or larger than P1. Next, the notification unit 2040 performs a second-level warning process of "displaying a warning screen on a display device or projecting a warning image onto the ground" when the conversation duration becomes equal to or larger than P2. Then, the notification unit 2040 performs a third-level warning process of "outputting a warning sound from a speaker" when the conversation duration becomes equal to or larger than P3.

By issuing multiple-stage warnings in accordance with the total duration of the conversations as described above, modest warnings may be issued if the total duration of the conversations remains short and more prominent warnings may be issued as the total duration of the conversations increases. It is therefore possible to maintain a fine balance between the magnitude of the effect of the warning and the degree to which the warning interferes with peoples' actions. That is, as long as the total duration of the conversations remains short, it is possible to issue a warning that disturbs the conversation as little as possible, even though this warning may not be very effective for stopping the conversation. On the other hand, when the total duration of the conversations becomes long, it is possible to issue a warning that has a great effect on stopping the conversation while accepting a disturbance of the conversation to some extent.

When multiple-stage warnings are issued in accordance with the total duration of the conversations, it is possible that the human group 40 is no longer in the suitable state at a timing when the total duration of the conversations has become equal to or larger than a threshold (e.g., the above-mentioned P1). In order to solve this problem, for example, the notification unit 2040 may not issue a warning notification until the human group 40 is in the suitable state again. That is, at a timing when the total duration of the conversations becomes equal to or larger than the threshold, the determination unit 2020 again determines whether or not the human group 40 is in the suitable state. The notification unit 2040 then issues a warning notification after it is determined that the human group 40 is in the suitable state.

The notification unit 2040 may issue notifications different from each other depending on the degree of importance of the conversation. Suppose that the degree of importance of the conversation computed by the determination unit 2020 is represented by 10 stages from 1 to 10. It is assumed here that the smaller the value of the degree of importance is, the lower the degree of importance is. Additionally, in this case, it is assumed that a situation in which the degree of importance of the conversation held by the human group 40 is 4 or smaller is handled as a situation in which the human group 40 is in the suitable state.

In this case, the degree of importance of the conversation held by the human group 40 that is determined to be in the suitable state is any one of 1 to 4. Therefore, for example, four-stage warning levels are provided so as to correspond to the degree of importance of the conversation determined to be in the suitable state. The lower the degree of importance of the conversation is, the higher the level of the warning should be. When the degree of importance of the conversation held by the human group 40 is 1, the notification unit 2040 outputs a warning of the highest warning level. On the other hand, when the degree of importance of the conversation had among the human group 40 is 4, the notification unit 2040 outputs a warning of the lowest warning level.

By issuing multiple-stage warnings in accordance with the degree of importance of the conversation as described above, modest warnings may be issued when the degree of importance of the conversation is high and more prominent warnings may be issued when the degree of importance of the conversation is low. It is therefore possible to strike a right balance between m the magnitude of the effect of the warning and the degree to which the warning interferes with peoples' actions, as described above.

Regarding Control of Mobile Robot 20

As described above, the notification unit 2040 may control the mobile robot 20 to move the mobile robot 20 to the candidate group or the human group 40. In order to move the mobile robot 20 to a specific destination, a travel path to this destination is set using map data that can be referred to by the mobile robot 20. Here, an apparatus that performs a process of computing the travel path to the destination using map data and setting the calculated travel path in the mobile robot 20 is referred to as a path setting apparatus. The path setting apparatus may be the mobile robot 20, the notification control apparatus 2000, or another apparatus.

The path setting apparatus acquires map data of the surveillance area, and computes the travel path of the mobile robot 20 based on the map data and the destination (the position to which the mobile robot 20 should be moved) that has been determined by the aforementioned various methods. The path setting apparatus then sets the computed travel path in the mobile robot 20. The mobile robot 20 moves in accordance with the set travel path. When the path setting apparatus is an apparatus other than the notification control apparatus 2000, the notification control apparatus 2000 provides information indicating the destination that should be set in the mobile robot 20 for the path setting apparatus.

Any existing technique may be used as a technique for computing the travel path based on the map data and the information on the destination.

The mobile robot 20 preferably moves in such a manner that it does not interfere with actions of people who are in the surveillance area. For example, the mobile robot 20 grasps the movement of each person who is in the surveillance area using the video data obtained from the camera provided in the mobile robot 20, and moves in such a way that the mobile robot 20 does not contact each of the persons. Various existing techniques (e.g., techniques for moving self-driving vehicles in such a way that they do not collide with other vehicles, passersby, etc.) may be employed as a technique for moving the mobile robot 20 while avoiding contact with people.

In another example, the mobile robot 20 preferably moves out of sight of persons who are not included in the candidate group or the human group 40. For example, if a person 10 who is not included in the candidate group or the human group 40 is detected from the video data obtained from the camera provided in the mobile robot 20, the path setting apparatus determines the direction of the face or the direction of the line-of-sight of this person 10. The path setting apparatus then computes a travel path for causing the mobile robot 20 to reach the destination while being out of sight of the person 10 based on the direction of the face or the direction of the line-of-sight that has been determined and the destination of the mobile robot 20, and sets this travel path in the mobile robot 20.

However, it may be difficult to move the mobile robot 20 with being out of the sight of the person 10 when, for example, the direction of the face or the direction of the line-of-sight of the person 10 repeatedly and significantly changes. In this case, for example, the path setting apparatus may detect only a person who is not likely to change the direction of his/her face or the direction of his/her line-of sight (e.g., a person who is standing still or a person who is sitting on a chair) from the video data and set the travel path of the mobile robot 20 in such a way that the mobile robot 20 moves with being out of sight of the detected person.

The mobile robot 20 may be stationary or moving until it receives control by the notification control apparatus 2000. In the latter case, for example, a travel path is set in the mobile robot 20 so that it performs patrol in a part or all of the surveillance area. In particular, when the camera provided in the mobile robot 20 is used to detect the human group 40, it is preferable to cause the mobile robot 20 to perform patrol in the surveillance area so that the human group 40 can be detected in various places in the surveillance area. Hereinafter, a travel path that is set in the mobile robot 20 for patrol may also be referred to as a patrol path.

The patrol path preferably includes an area having a high density of people (i.e., a highly populated area) of the surveillance area. For example, the patrol path is set so as to include only an area having a high density of people of the surveillance area. In another example, the patrol path is set in such a way that the frequency with which it performs patrol in an area having a high density of people is higher than the frequency with which it performs patrol in an area having a low density of people.

Further, when there is a camera that is installed on the ceiling or the like of the surveillance area (hereinafter this camera will be referred to as a fixed camera) and both the fixed camera and the camera provided in the mobile robot 20 are used to detect a human group 40, the patrol path of the mobile robot 20 preferably includes an area that is not included in the capturing range of the fixed camera (hereinafter this area will be referred to as an out-of-focus area). Accordingly, it is possible to cause the mobile robot 20 to capture an area that is difficult for the fixed camera to capture, whereby the surveillance area can be monitored broadly.

The patrol path may be manually set or may be automatically set by the path setting apparatus. In the latter case, for example, the path setting apparatus determines the out-of-focus area for the fixed camera by analyzing the video data generated by the fixed camera, and generates a patrol path including this out-of-focus area. More specifically, the path setting apparatus determines the area in the capturing range of the fixed camera using map data of the surveillance area and the video data generated by the fixed camera, and determines the area other than the determined area as the out-of-focus area.

Suppose that the out-of-focus area is a closed area. In this case, the path setting apparatus generates the patrol path in such a way that the patrol is performed inside the out-of-focus area. On the other hand, suppose that the out-of-focus area is a plurality of areas that are not connected to each other. In this case, for example, the path setting apparatus generates the patrol path in such a way that the patrol is performed in these plurality of out-of-focus areas in turn. When a plurality of mobile robots 20 are provided in the surveillance area, patrol paths that are different from each other may be set for the respective mobile robots 20. In this case, the patrol paths preferably include out-of-focus areas that are different from each other.

While the present application has been described with reference to the example embodiments, the present application is not limited to the aforementioned example embodiments. Various changes that may be understood by one skilled in the art may be made to the configurations and the details of the present application within the scope of the present application.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM, CD-R, CD-R/W, semiconductor memories (such as mask ROM, Programmable ROM (PROM), Erasable PROM (EPROM), flash ROM, RAM, etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The whole or part of the example embodiments disclosed above can be described as, but not limited to, the following supplementary notes.

Supplementary Note 1

A notification control apparatus comprising:
a determination unit configured to acquire, for a plurality of persons who have a conversation within a predetermined distance of each other in a surveillance area, video data including the plurality of persons or audio data including voices of the plurality of persons, and analyze the video data or the audio data to determine whether or not the plurality of persons are in a state suitable for receiving a predetermined notification; and
a notification unit configured to output the predetermined notification when it is determined that the plurality of persons are in the state suitable for receiving the predetermined notification.

Supplementary Note 2

The notification control apparatus according to Supplementary note 1, wherein the determination unit performs:
determining whether or not the conversation held by the plurality of persons is interrupted using the video data or the audio data; and
determining that the plurality of persons are in the state suitable for receiving the predetermined notification when the conversation held by the plurality of persons is interrupted.

Supplementary Note 3

The notification control apparatus according to Supplementary note 1, wherein the determination unit performs:
determining whether or not the conversation held by the plurality of persons is important using the video data or the audio data; and
determining that the plurality of persons are in the state suitable for receiving the predetermined notification when the conversation is not important.

Supplementary Note 4

The notification control apparatus according to Supplementary note 3, wherein the determination unit performs:

determining that the conversation held by the plurality of persons is not important when an important expression is not included in the conversation held by the plurality of persons; or determining that the conversation held by the plurality of persons is not important when the proportion of important expressions in the conversation held by the plurality of persons is smaller than a threshold.

Supplementary Note 5

The notification control apparatus according to any one of Supplementary notes 1 to 4,
wherein the predetermined notification is output from a mobile robot, and
wherein the notification unit moves the mobile robot to approach the plurality of persons when it is determined that the plurality of persons are not in the state suitable for receiving the predetermined notification.

Supplementary Note 6

The notification control apparatus according to any one of Supplementary notes 1 to 5, wherein the notification unit causes an output direction of a directional speaker provided in the mobile robot to be directed to the plurality of persons and causes the directional speaker to output the predetermined notification.

Supplementary Note 7

The notification control apparatus according to any one of Supplementary notes 1 to 6, wherein the predetermined notification includes information by which a distance that should be secured between people in order to prevent infection with an infectious disease can be grasped.

Supplementary Note 8

The notification control apparatus according to any one of Supplementary notes 1 to 7,
wherein the determination unit computes a duration of a conversation held by the plurality of persons, and
wherein the notification unit outputs a notification in accordance with the computed duration.

Supplementary Note 9

The notification control apparatus according to any one of Supplementary notes 1 to 7,
wherein the determination unit computes the degree of importance of the conversation held by the plurality of persons, and
wherein the notification unit outputs a notification in accordance with the computed degree of importance.

Supplementary Note 10

A notification control method executed by a computer, comprising:
a determining step of acquiring, for a plurality of persons who have a conversation within a predetermined distance of each other in a surveillance area, video data including the plurality of persons or audio data including voices of the plurality of persons and analyzing the video data or the audio data to determine whether or not the plurality of persons are in a state suitable for receiving a predetermined notification; and
a notifying step of outputting the predetermined notification when it is determined that the plurality of persons are in the state suitable for receiving the predetermined notification.

Supplementary Note 11

The notification control method according to Supplementary note 10, wherein
in the determining step,
it is determined whether or not the conversation held by the plurality of persons is interrupted using the video data or the audio data, and
it is determined that the plurality of persons are in the state suitable for receiving the predetermined notification when the conversation held by the plurality of persons is interrupted.

Supplementary Note 12

The notification control method according to Supplementary note 10, wherein
in the determining step,
it is determined whether or not the conversation held by the plurality of persons is important using the video data or the audio data, and
it is determined that the plurality of persons are in the state suitable for receiving the predetermined notification when the conversation is not important.

Supplementary Note 13

The notification control method according to Supplementary note 12, wherein
in the determining step,
it is determined that the conversation held by the plurality of persons is not important when an important expression is not included in the conversation held by the plurality of persons, or
it is determined that the conversation held by the plurality of persons is not important when the proportion of important expressions in the conversation held by the plurality of persons is smaller than a threshold.

Supplementary Note 14

The notification control method according to any one of Supplementary notes 10 to 13,
wherein the predetermined notification is output from a mobile robot, and
wherein in the notifying step, the mobile robot is moved to approach the plurality of persons when it is determined that the plurality of persons are not in the state suitable for receiving the predetermined notification.

Supplementary Note 15

The notification control method according to any one of Supplementary notes 10 to 14, wherein, in the notifying step, an output direction of a directional speaker provided in the mobile robot is directed to the plurality of persons and the directional speaker is caused to output the predetermined notification.

Supplementary Note 16

The notification control method according to any one of Supplementary notes 10 to 15, wherein the predetermined notification includes information by which a distance that should be secured between people in order to prevent infection with an infectious disease can be grasped.

Supplementary Note 17

The notification control method according to any one of Supplementary notes 10 to 16, wherein
in the determining step, a duration of a conversation held by the plurality of persons is computed, and
in the notifying step, a notification is output in accordance with the computed duration.

Supplementary Note 18

The notification control method according to any one of Supplementary notes 10 to 16, wherein
in the determining step, the degree of importance of the conversation held by the plurality of persons is computed, and
in the notifying step, a notification in accordance with the computed degree of importance is output.

Supplementary Note 19

A computer readable medium storing a program that causes a computer to execute:
a determining step of acquiring, for a plurality of persons who have a conversation within a predetermined distance of each other in a surveillance area, video data including the plurality of persons or audio data including voices of the plurality of persons and analyzing the video data or the audio data to determine whether or not the plurality of persons are in a state suitable for receiving a predetermined notification; and
a notifying step of outputting the predetermined notification when it is determined that the plurality of persons are in the state suitable for receiving the predetermined notification.

Supplementary Note 20

The computer readable medium according to Supplementary note 19, wherein
in the determining step,
it is determined whether or not the conversation held by the plurality of persons is interrupted using the video data or the audio data, and
it is determined that the plurality of persons are in the state suitable for receiving the predetermined notification when the conversation held by the plurality of persons is interrupted.

Supplementary Note 21

The computer readable medium according to Supplementary note 19,
in the determining step,
it is determined whether or not the conversation held by the plurality of persons is important using the video data or the audio data, and
it is determined that the plurality of persons are in the state suitable for receiving the predetermined notification when the conversation is not important.

Supplementary Note 22

The computer readable medium according to Supplementary note 21, wherein
in the determining step,
it is determined that the conversation held by the plurality of persons is not important when an important expression is not included in the conversation held by the plurality of persons, or
it is determined that the conversation held by the plurality of persons is not important when the proportion of important expressions in the conversation held by the plurality of persons is smaller than a threshold.

Supplementary Note 23

The computer readable medium according to any one of Supplementary note 19 to 22,
wherein the predetermined notification is output from a mobile robot, and
wherein in the notifying step, the mobile robot is moved to approach the plurality of persons when it is determined that the plurality of persons are not in the state suitable for receiving the predetermined notification.

Supplementary Note 24

The computer readable medium according to any one of Supplementary note 19 to 23, wherein, in the notifying step, an output direction of a directional speaker provided in the mobile robot is directed to the plurality of persons and the directional speaker is caused to output the predetermined notification.

Supplementary Note 25

The computer readable medium according to any one of Supplementary note 19 to 24, wherein the predetermined notification includes information by which a distance that should be secured between people in order to prevent infection with an infectious disease can be grasped.

Supplementary Note 26

The computer readable medium according to any one of Supplementary note 19 to 25, wherein
in the determining step, a duration of a conversation held by the plurality of persons is computed, and
in the notifying step, a notification is output in accordance with the duration.

Supplementary Note 27

The computer readable medium according to any one of Supplementary note 19 to 25, wherein
in the determining step, the degree of importance of the conversation held by the plurality of persons is computed, and
in the notifying step, a notification in accordance with the computed degree of importance is output.

REFERENCE SIGNS LIST

10 Person
20 Mobile Robot

22 Camera
24 Microphone
26 Actuator
27 Moving Means
40 Human group
50 Storage device
60 Conversation Information
500 Computer
502 Bus
504 Processor
506 Memory
508 Storage Device
510 Input/output Interface
512 Network Interface
600 Controller
602 Bus
604 Processor
606 Memory
608 Storage Device
610 Input/output Interface
612 Network Interface
2000 Notification Control Apparatus
2020 Determination Unit
2040 Notification Unit

What is claimed is:

1. A notification control apparatus comprising:
a determination unit configured to acquire, for a plurality of persons who have a conversation within a predetermined distance of each other in a surveillance area, video data including the plurality of persons or audio data including voices of the plurality of persons, and analyze the video data or the audio data to determine whether or not the plurality of persons are in a state suitable for receiving a predetermined notification; and
a notification unit configured to output the predetermined notification when it is determined that the plurality of persons are in the state suitable for receiving the predetermined notification,
wherein the determination unit performs:
determining whether or not the conversation held by the plurality of persons is important using the video data or the audio data; and
determining that the plurality of persons are in the state suitable for receiving the predetermined notification when the conversation is not important.

2. The notification control apparatus according to claim 1, wherein the determination unit performs:
determining whether or not the conversation held by the plurality of persons is interrupted using the video data or the audio data; and
determining that the plurality of persons are in the state suitable for receiving the predetermined notification when the conversation held by the plurality of persons is interrupted.

3. The notification control apparatus according to claim 1, wherein the determination unit performs:
determining that the conversation held by the plurality of persons is not important when an important expression is not included in the conversation held by the plurality of persons; or
determining that the conversation held by the plurality of persons is not important when the proportion of important expressions in the conversation held by the plurality of persons is smaller than a threshold.

4. The notification control apparatus according to claim 1, wherein the predetermined notification is output from a mobile robot, and
wherein the notification unit moves the mobile robot to approach the plurality of persons when it is determined that the plurality of persons are not in the state suitable for receiving the predetermined notification.

5. The notification control apparatus according to claim 4, wherein the notification unit causes an output direction of a directional speaker provided in the mobile robot to be directed to the plurality of persons and causes the directional speaker to output the predetermined notification.

6. The notification control apparatus according to claim 1, wherein the predetermined notification includes information by which a distance that should be secured between people in order to prevent infection with an infectious disease can be grasped.

7. The notification control apparatus according to claim 1,
wherein the determination unit computes a duration of a conversation held by the plurality of persons, and
wherein the notification unit outputs a notification in accordance with the computed duration.

8. The notification control apparatus according to claim 1,
wherein the determination unit computes a degree of importance of the conversation held by the plurality of persons, and
wherein the notification unit outputs a notification in accordance with the computed degree of importance.

9. A notification control method executed by a a notification control apparatus and comprising:
a determining step of acquiring, by a determination unit of the notification control apparatus and for a plurality of persons who have a conversation within a predetermined distance of each other in a surveillance area, video data including the plurality of persons or audio data including voices of the plurality of persons and analyzing the video data or the audio data to determine whether or not the plurality of persons are in a state suitable for receiving a predetermined notification; and
a notifying step of outputting, by a notification unit of the notification control apparatus, the predetermined notification when it is determined that the plurality of persons are in the state suitable for receiving the predetermined notification,
wherein the determining step comprises:
determining whether or not the conversation held by the plurality of persons is important using the video data or the audio data; and
determining that the plurality of persons are in the state suitable for receiving the predetermined notification when the conversation is not important.

10. A non-transitory computer readable medium storing a program that causes a computer to execute:
a determining step of acquiring, for a plurality of persons who have a conversation within a predetermined distance of each other in a surveillance area, video data including the plurality of persons or audio data including voices of the plurality of persons and analyzing the video data or the audio data to determine whether or not the plurality of persons are in a state suitable for receiving a predetermined notification; and
a notifying step of outputting the predetermined notification when it is determined that the plurality of persons are in the state suitable for receiving the predetermined notification,
wherein the determining step comprises:
determining whether or not the conversation held by the plurality of persons is important using the video data or the audio data; and determining that the plurality of persons are in the state suitable for receiving the predetermined notification when the conversation is not important.

* * * * *